United States Patent
Sunwoo

(10) Patent No.: US 7,437,395 B2
(45) Date of Patent: Oct. 14, 2008

(54) FFT OPERATING APPARATUS OF PROGRAMMABLE PROCESSORS AND OPERATION METHOD THEREOF

(75) Inventor: Myung-hoon Sunwoo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 837 days.

(21) Appl. No.: 10/731,404

(22) Filed: Dec. 10, 2003

(65) Prior Publication Data

US 2005/0131976 A1    Jun. 16, 2005

(30) Foreign Application Priority Data

Dec. 10, 2003   (KR) .............................. 2002-78393

(51) Int. Cl.
*G06F 15/00*   (2006.01)
(52) U.S. Cl. ........................................ 708/404
(58) Field of Classification Search ................. 708/404
See application file for complete search history.

(56) References Cited

U.S. PATENT DOCUMENTS

| | | | |
|---|---|---|---|
| 4,996,661 A | 2/1991 | Cox et al. | |
| 5,430,667 A | 7/1995 | Takano | |
| 6,304,887 B1* | 10/2001 | Ju et al. | 708/404 |
| 7,047,268 B2* | 5/2006 | Harley et al. | 708/404 |
| 2003/0225807 A1* | 12/2003 | Efland | 708/404 |
| 2004/0071104 A1* | 4/2004 | Boesel et al. | 370/320 |

FOREIGN PATENT DOCUMENTS

| | | |
|---|---|---|
| EP | 0889416 A2 | 1/1999 |
| WO | WO 02/091221 A2 | 11/2002 |

OTHER PUBLICATIONS

"Carmel The DSP For System-On-Chip Solutions Architecture Overview" XP-002473938, Infineon Technologies, www.infineon.com/dsp, V1.0 Jun. 1, 2000, pp. 32 (in English).

B. Hamilton, "Programmable Architecture For Matrix and Signal Processing", Space Tech Corporation Fort Collins, Colorado, 1988 IEEE, pp. 116-120 (in English).

(Continued)

*Primary Examiner*—Tan V. Mai
(74) *Attorney, Agent, or Firm*—Staas & Halsey LLP

(57) ABSTRACT

A fast Fourier transform (FFT) operating apparatus and a method thereof carries out an FFT operation in a programmable processor chip. A program controller generates an FFT start signal and controls a programmable processor, and a program memory stores an application of the programmable processor. An FFT address generator removes the looping instruction used for the FFT and a cycle for an address generator, and generates an offset address of a butterfly input data and an operation end signal. An address generator calculates an address of a data memory using the offset address generated in the FFT address generator and a data memory stores data. A data processor carries out an arithmetic and logic operation using the data stored in the data memory and a flag register generates an FFT operation signal.

13 Claims, 11 Drawing Sheets

OTHER PUBLICATIONS

Heo et al., "Application-Specific DSP Architecture For Fast Fourier Transform", Computer Society, School of Electrical and Computer Engineering, Ajou University, XP-002473936, 2003 IEEE, pp. 13 pgs (in English).

Lee et al, "Implementation Of Application-Specific DSP For OFDM System", School of Electrical and Computer Engineering, Ajou University, XP-002473937, 2004 IEEE, pp. 665-668 (in English).

European Search Report for corresponding European Patent Application No.:03257773 dated Apr. 7, 2008, 4 pgs (in English).

* cited by examiner do # THE NUMBER OF STAGES      STAGE REPEAT do # THE NUMBER OF GROUPS      GROUP REPEAT

TWIDDLE FACTOR OF GROUP LOAD do # THE NUMBER OF BUTTERFLIES IN GROUP     BUTTERFLY REPEAT

BUTTERFLY OPERATION

⋮ end BUTTERFLY REPEAT end GROUP REPEAT end STAGE REPEAT

FFT OPERATING APPARATUS OF PROGRAMMABLE PROCESSORS AND OPERATION METHOD THEREOF

CROSS-REFERENCE TO RELATED APPLICATIONS

This application claims the benefit of Korean Patent Application No. 2002-78393 filed Dec. 10, 2003, in the Korean Intellectual Property Office, the disclosure of which is incorporated herein by reference.

BACKGROUND

1. Field of the Invention

The present invention relates to a fast Fourier transform (FFT) operating apparatus and an operation method thereof. More particularly, in a programmable processor used with a variety of standards and enabling processing of high speed telecommunication algorithms in a real-time basis and also guaranteeing flexibility in system design, the present invention relates to an FFT operating apparatus and a method thereof for carrying out FFT operation which is the kernel function of DMT (Discrete MultiTone) and OFDM (Orthogonal Frequency Division Multiplexing) modems.

2. Description of the Related Art

Generally, fast Fourier transform (FFT) are used in a variety of fields of communication systems such as with an asymmetric digital subscriber line (ADSL), wireless asynchronous transfer mode (ATM), a short distance wireless communication network, and applications such as a matched filter, spectrum analysis, and a radar. The FFT is required for the establishment of OFDM, i.e., the next-generation high speed telecommunication algorithm. The FFT is the algorithm that transforms a signal in a time domain into a signal in a frequency domain. Since the FFT significantly reduces the number of operations required for a Discrete Fourier Transform (DFT) by using the periodicity of trigonometric functions, operations are carried out with increased efficiency. The DFT is expressed by the following formula 1:

$$X(k) = \sum_{n=0}^{N-1} x(n) w_N^{kn} \quad \text{[Formula 1]}$$
$$k = 0, 1, \ldots, N-1$$
$$w_N^{kn} = e^{-j2\pi nk/N}$$

By re-arranging x(n) in formula 1 into odd-numbered and even-numbered samples, respectively, N-point DFT is divided into two N/2-point DFTs and expressed as the following formula 2:

$$X(k) = \sum_{n=0}^{N-1} x(n) w_N^{nk} \quad \text{[Formula 2]}$$
$$= \sum_{n=0,even}^{N-1} x(n) w_N^{nk} + \sum_{n=0,odd}^{N-1} x(n) w_N^{nk}$$
$$= \sum_{l=0}^{N/2-1} x(2l) w_N^{2lk} + \sum_{l=0}^{N/2-1} x(2l+1) w_N^{(2l+1)k}$$

-continued
$$= \sum_{n=0}^{N/2-1} x(2n) w_{N/2}^{nk} + \sum_{n=0}^{N/2-1} x(2n+1) w_{N/2}^{(2n+1)k}$$

As formula 2 is repeated, the N-point DFT is divided into several 2-point DFTs, and this process is referred to as radix-2 DIT (Decimation-in-Time) FFT.

Among methods used to split the DFT of formula 1, radix-2 and radix-4 DIT FFTs are the methods most frequently used.

The radix-2 DIT FFT is split into odd-numbered and even-numbered samples as in formula 2, while the radix-4 DIT FFT is split into four sets. In a comparison of these two FFTs, the radix-2 DIT FFT has a simpler butterfly structure, and thus requires fewer multipliers and less area. However, the number of stages increases in the radix-2 DIT FFT, and thus it uses many more operation cycles than the radix-4 DIT FFT. The radix-4 DIT FFT also permits high speed processing, but it has a complicated butterfly structure and increases the number of multipliers. Also, calculations for butterfly input data addresses are complicated and difficult to implement. Additionally, as the FFT having $4^n$ length performed, the radix-4 DIT FFT has to be used in combination with the radix-2 DIT FFT for the FFT having a $2^n$ length.

Further, the FFT is divided into DIT (Decimation-In-Time) FFT and DIF (Decimation-In-Frequency) FFT according to whether the division operation is based on a time domain or a frequency domain. Formula 2, which is divided with respect to the time domain, is categorized as a DIT FFT. If the division operation is performed with respect to X(k) in the frequency domain, the FFT is a DIF FFT.

In a digital signal processor, the DIT FFT is usually used as the FFT. While the DIF FFT performs addition/subtraction and then multiplication, the DIT FFT, as shown in FIG. 1, performs multiplication and then addition/subtraction. Accordingly, for a digital signal processor based on a multiplier-accumulator, the DIT FFT is more suitable for operations.

For example, a DSP 56600 core is a fixed-point digital signal processor that consists of one 16×16 multiplier-accumulator (MAC) and one 40-bit ALU (arithmetic and logic unit), and carries out a radix-2 complex FFT butterfly operation using two parallel move instructions. Since the DSP 56600 core has the configuration of a single multiplier-accumulator, the DSP 56600 core has a small area, but less operating efficiency than a dual multiplier-accumulator. The DSP 56600 core requires 8N+9 cycles to perform N radix-2 complex FFT butterfly operations.

FIG. 2 shows another example of an operator using the DIT FFT, i.e., a Carmel™ DSP core by Infineon Technologies AG. The Carmel™ DSP core is a 16 bit fixed-point decimation core, which includes two multiplexers 11, 11' to select values for a data memory, two latch registers 12, 12' to store selected outputs from the multiplexers 11, 11', and data bus switches 13, 13' to switch data from data operations and data from a data memory so as to input a corresponding operator in accordance with a desired operation. The Carmel™ DSP core also includes registers 14, 14' storing data for input to a next-stage multiplier-accumulator, a first arithmetic unit 15 having a 16×16 MAC, a 40-bit ALU, an exponenter and a shifter for a block floating point operation, a second arithmetic unit 16 having a 16×16 MAC and a 40-bit ALU, and an accumulator bank 17 to accumulate and store results obtained in the first and second arithmetic unit 15, 16 and switched by the data bus switches 13, 13'. The Carmel™ DSP core, which adopts a CLIW (Configurable Long Instruction Word) architecture, carries out up to 6 operations including 2 parallel data move in a single cycle. Also, since the Carmel™ DSP core supports an automatic scaling mode, an overflow generated in the FFT operations is handled without having to use an additional cycle. However, the Carmel™ DSP core has a complex hardware configuration since the Carmel™ DSP core is designed with CLIW architecture to allow the parallel processing of the operations. The Carmel™ DSP core requires 2N+2 cycles to perform N radix-2 complex FFT butterfly operations.

FIG. 3 shows another example of an operator using the DIT FFT, i.e., a Starcore™ SC140 operator. The SC140, applying a VLIW (Very Long Instruction Word) architecture, includes two data memory buses 21, 21' to send/receive data to and from the data memory. The SC140 also includes eight shifter/limiters 22 to shift or limit the operated data stored in the data register and load the data to the data memory buses 21, 21', the data register stores an input and an output of operation units, and four 40-bit ALUs 24, 25, 26, 27. Since each of the ALUs 24, 25, 26, 27 has a MAC, it is possible to carry out up to four MAC operations or ALU operations in a single cycle. As a result, using the four MACs, the FFT operations are carried out with fewer operation cycles than the digital signal processor that has a single or dual MAC.

However, the Starcore™ SC140 has a large size and consumes a lot of power due to the integration of many of the operation components. Further, it is difficult to efficiently allot the operation components due to the data dependency, and it is difficult to read or write required data from/into the memory during a single cycle due to a lack of a data bus. As a result, the performance of the four MAC structure can not reach to twice as much as that of the dual MAC structure.

In performing N complex FFT butterfly operations using the SC140, 1.5N cycles are required. The above digital signal processors focus on increasing the number of the operators to accelerate the FFT butterfly operation or adjusting the data path to fit the butterfly operation flow. However, the reduction of the number of operation cycles of the butterfly is limited with respect to the limited number of the operators.

Assuming that two cycles are required for the butterfly operation, $(N/2)\log_2 N$ butterflies are needed for the N-point FFT. Thus, if other influences are not considered, $(2N/2)\log_2 N$ cycles are needed for the N-point FFT. In fact, during the FFT operation, operation cycles may be additionally generated for data movement or data address calculations.

Table 1 shows a comparison in the number of the butterfly operation cycles and the N-point FFT operation cycles of the Carmel DSP core and the TMS320C62x. As shown in Table 1, except for the butterfly operation cycle, additional cycles are required. For the Carmel DSP core, $(2N/2)\log_2 N$ cycles are needed for the butterfly operation, and for the TMS320C62x, $(4N/2)\log_2 N$ cycles are needed.

TABLE 1

|  | Number of butterfly operation cycles | Number of N-point FFT operation cycles |
| --- | --- | --- |
| Carmel DSP | 2 | $(2 N/2)\log_2 N + 5 N/4 + 10 \log_2 N + 4$ |
| TMS320C62x | 4 | $(4 N/2)\log_2 N + 7 \log_2 N + N/4 + 9$ |

FIG. 4 shows an operation of a general 8-point radix-2 DIT FFT. In the N point FFT operation, there are $\log_2 N$ stages and N−1 groups. Accordingly, there are three stages and seven groups shown in FIG. 4, and as the number of the stages increases, the number of the butterflies in the group increases or decreases.

The FFT operation is carried out in one stage and repeated in the next stage. Within a stage, the operation is carried out by the group. In using C or assembly language to implement the FFT, as shown in FIG. 5, three looping instructions are used for the operations of the stages, the groups, and the butterflies in each group, which may vary according to the architectures of a programmable processor and the program. Generally, three or four cycles are required to carry out the looping instruction in the digital signal processor. Assuming that L cycles are required for a single butterfly operation and M cycles are required to carry out the looping instruction, the number of the cycles to carry out the N point FFT operation is obtained through the following formula 3.

$$(L\times N/2)\log_2 N + M\times(N-1) + M\log_2 N = \alpha \qquad \text{[Formula 3]}$$

In formula 3, the value of the expression $(L\times N/2)\log_2 N$, which is determined by L, may be changed according to the number of the MACs and the ALUs in the digital signal processor, and the value of the expression $M\times(N-1)+M\log_2 N$, which is determined by M, may be changed according to the configuration of a program controller in the digital signal processor.

In the butterfly operation for a group of a stage, the address of input data is increased by one. When the group is altered, the address of input data of a butterfly varies according to the size of the group. In formula 3, α is used to denote the number of the required cycles and the cycles required for the data move. If parallel processing is feasible as in the VLIW processor, the number of the additional operation cycles, except for the butterfly, is reduced to some degree by parallel-processing diverse instructions through the assembly coding. However, the reductions due to parallel processing are not sufficient. Referring to FIG. 4, address modification according to the alteration of the group is described. For example, "a" in the first butterfly (①in FIG. 4, group 1) of the stage 2 is a memory address 0 and "b" is a memory address 2. In FIG. 4, "a" in the second butterfly of the stage 2 (② in FIG. 4, group 1) is memory address 1, and "b" is memory address 3. In FIG. 4, "a" in the third butterfly of the stage 2 (③ group 2 in FIG. 4, group 2) is memory address 4, and "b" is memory address 6. The address of the input data "a" in group 1 increases from 0 by a value of 1. As the operation progresses from group 1 to group 2, the address of "a" changes from 1 to 4. That is, as the group is changed, the address increment of the input data also changes.

As aforementioned, to reduce the number of the operation cycles of the N point FFT in the programmable processor such as the digital signal processor, it is required to minimize the additional operation cycles except for the butterfly operation cycles. However, since the conventional digital processors do not support a hardware structure to reduce the additional operation cycles, it is difficult to reduce the number of the operation cycles.

SUMMARY OF THE INVENTION

An aspect of the present invention is to provide a fast Fourier transform (FFT) operating apparatus and an operation method thereof to reduce operations cycles that are additionally generated in a programmable processor except for a butterfly operation.

To achieve the above aspect of the present invention, a radix-2 complex FFT operation method to carry out an FFT operation in the programmable processor includes generating a start signal and applying an FFT operation signal if the FFT starts, generating an offset address of a butterfly input/output data to read a data and write an operated result in a data memory, and storing the generated offset address of the butterfly input/output data in an offset register of a programmable processor. The method further includes switching data to provide the butterfly input data from the data memory and write the output data in the data memory, carrying out a butterfly operation using two multiplier-accumulators, i.e., an arithmetic and logic unit, and an exponenter, and generating a stop signal and resetting the FFT operation signal when the operation is ended. For example, using operation instructions SBUTTERFLY (subtract butterfly) and ABUTTERFLY (add butterfly), the FFT operation apparatus carries out the FFT operation.

According to an aspect of the present invention, even in a programmable processor in which performance is not enhanced through the acceleration of the butterfly operation, performance is enhanced by minimizing operation cycles generated during a looping instruction, data move, and address calculation of butterfly input data except for the butterfly operations.

Additional aspects and/or advantages of the invention will be set forth in part in the description which follows and, in part, will be obvious from the description, or may be learned by practice of the invention.

BRIEF DESCRIPTION OF THE DRAWINGS

The above aspects and other features of the present invention will become more apparent by describing in detail a preferred embodiment thereof with reference to the attached drawings, in which.

DETAILED DESCRIPTION OF THE PREFERRED EMBODIMENT

Figure 1:
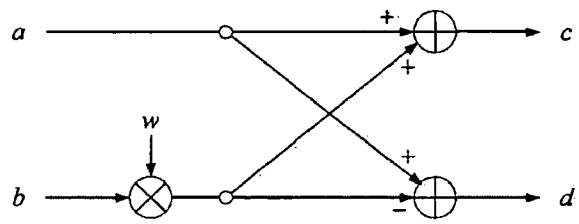
FIG. 1 is a view showing a structure of a DIT FFT butterfly.
Figure 2:
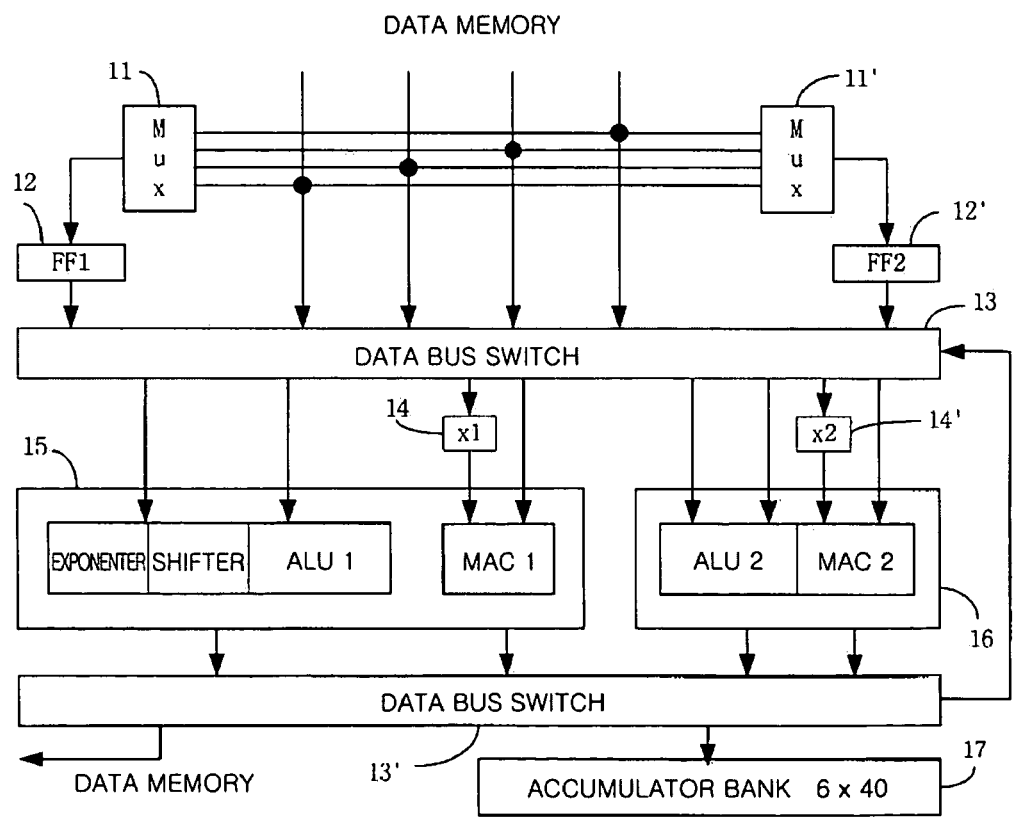
FIG. 2 is a view showing a configuration of the conventional Carmel DSP core operator by Infineon Technologies AG.
Figure 3:
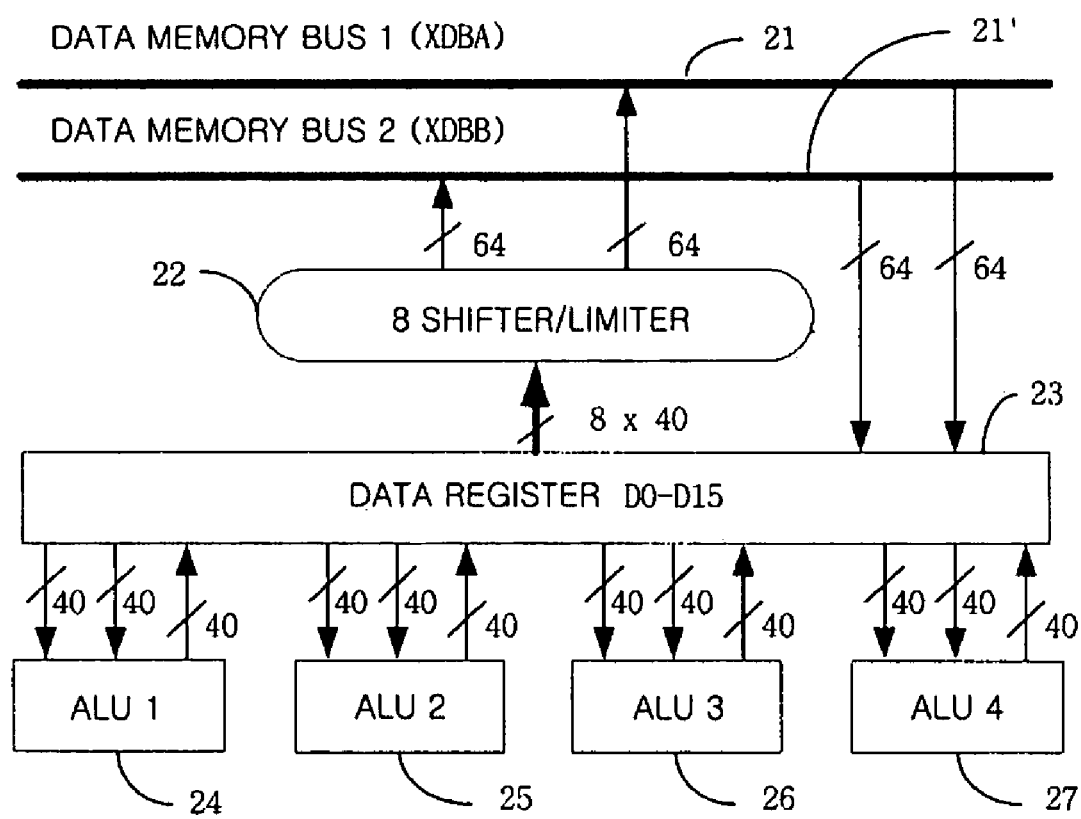
FIG. 3 is a view showing a configuration of the conventional SC140 operator by Starcore™.
Figure 4:
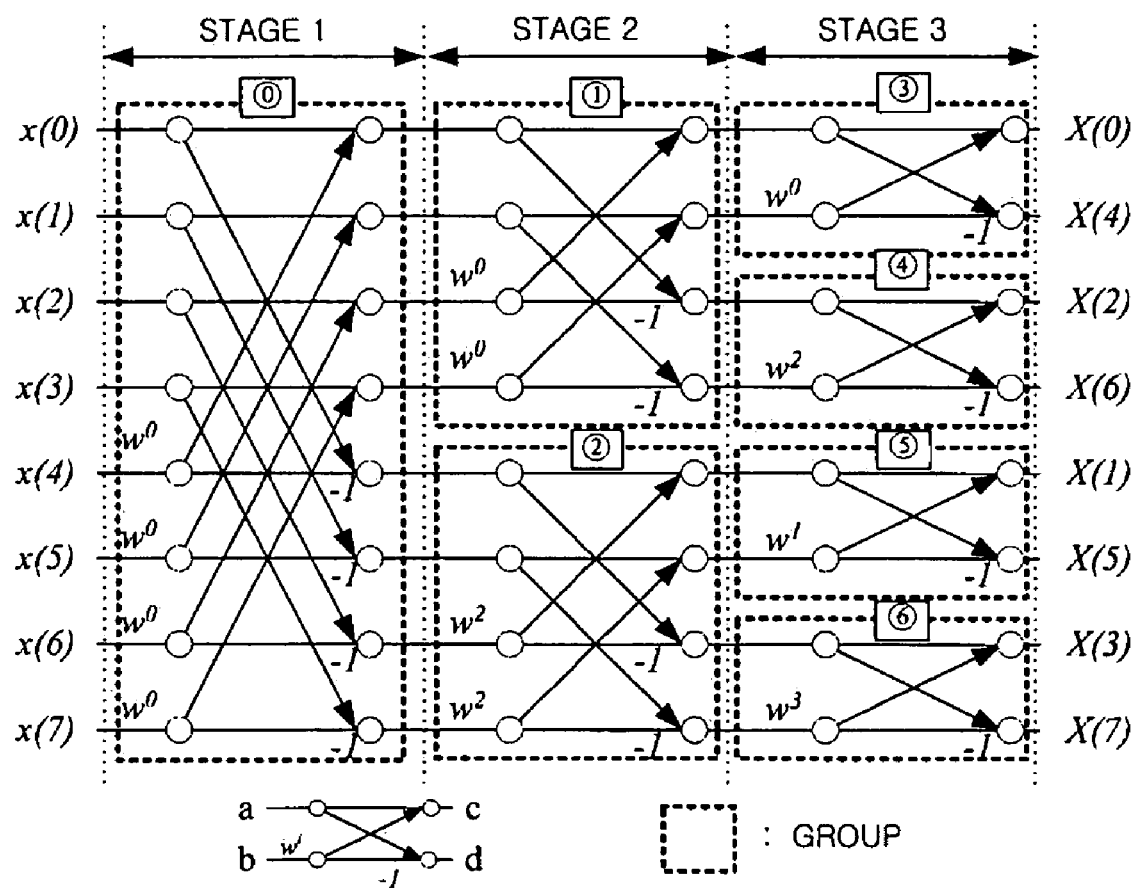
FIG. 4 is a flow graph showing an operation of a conventional 8-point radix-2 DIT FFT.

Reference will now be made in detail to the embodiments of the present invention, examples of which are illustrated in the accompanying drawings, wherein like reference numerals refer to the like elements throughout. The embodiments are described below to explain the present invention by referring to the figures.

Figures 5, 6:
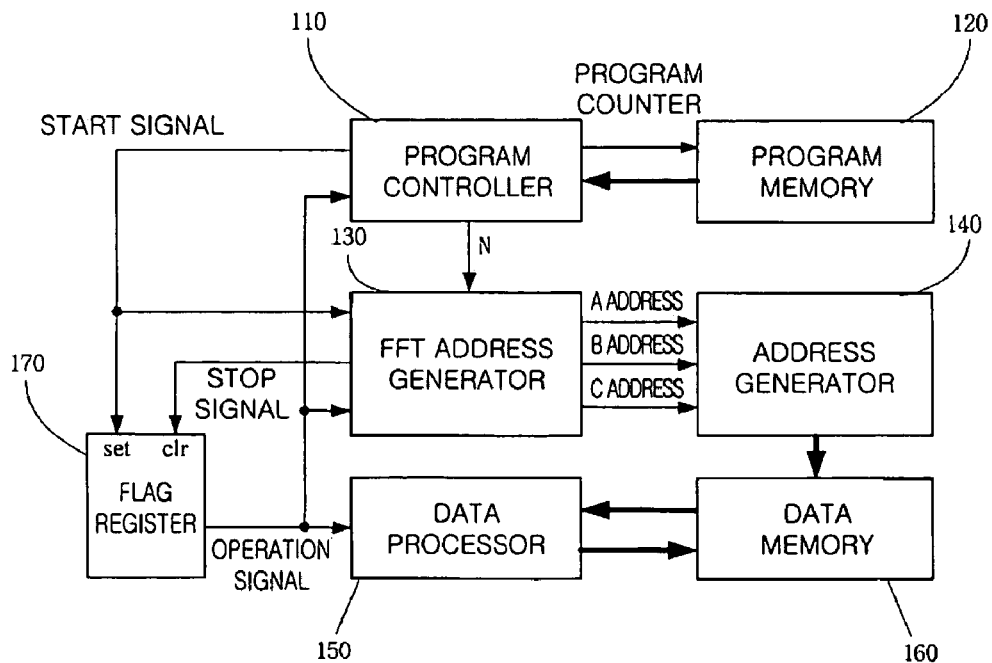
FIG. 5 is a view showing a programming architecture of an FFT using a looping instruction.
FIG. 6 is a view showing a configuration of a programmable processor for FFT according to an aspect of the present invention.

FIG. 6 shows a fast Fourier transform (FFT) operating apparatus to speedily perform an N point radix-2 DIT FFT operation without generating additional cycles except for butterfly operations. Referring to FIG. 6, the FFT operating apparatus includes a program controller 110, a program memory 120, an FFT address generator 130, an address generator 140, a data processor 150, a data memory 160, and a flag register 170.

The program controller 110 generates an FFT start signal and controls a programmable processor. The program memory 120 stores an application of the programmable processor. The FFT address generator 130 generates an offset address of an FFT butterfly input data and an operation stop signal. The address generator 140 uses the offset address generated in the FFT address generator 130 to calculate an address of the data memory 160. The data memory 160 stores data, and the data processor 150 uses the data stored in the data memory 160 to carry out an arithmetic and logic operation. The flag register 170 generates an FFT operation signal.

The data processor 150 includes a data bus switch circuit to receive the butterfly input data from the data memory 160 and to write output data in the data memory 160, and a butterfly operation circuit having two multiplier-accumulators to multiply and accumulate the data and one arithmetic and logic unit. The data processor 150 also includes an exponential operation circuit to carry out an exponential operation of the data during the butterfly operation, an input register to store data memory values, and an accumulator to store operation results and reuse the stored data for the operation.

Figure 7:
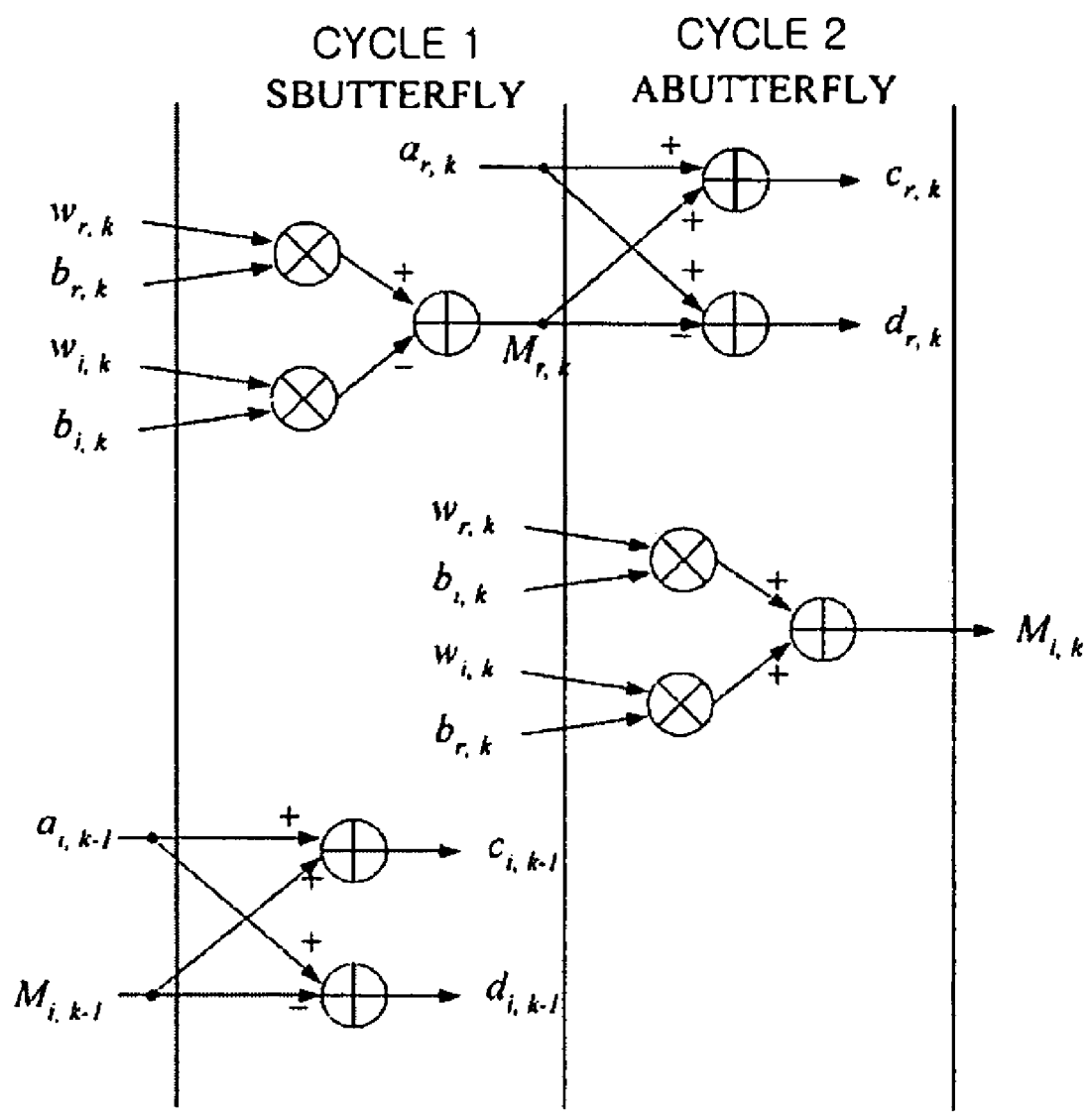
FIG. 7 is a flow graph showing an operation of a butterfly according to an aspect of the present invention.

FIG. 7 is a flow graph of the butterfly operation according to an aspect of the present invention, which shows a butterfly as a complex operation. The complex operation is represented as the following formula 4 where "a" and "b" denote the butterfly input data, "c" and "d" denote the butterfly output data, and "w" denotes a twiddle factor. Subscripts "r" and "i" respectively denote a real part and an imaginary part of each data.

$$c_r = a_r + w_r b_r - w_i b_i$$

$$c_i = a_i + w_r b_i + w_i b_r$$

$$d_r = a_r - w_r b_r + w_i b_i$$

$$d_i = a_i - w_r b_i - w_i b_r \quad \text{[Formula 4]}$$

To operate a single complex butterfly, six pieces of input data are required and four pieces of output data are generated. The operation is carried out divided into two cycles, and implemented using a data memory configuration capable of reading three pieces of input data and writing two pieces of output data in a single cycle. In a first cycle, two of the four pieces of input data are multiplied and subtracted. This operation is carried out according to an operational instruction, for example, SBUTTERFLY. In a second cycle, two of the four pieces of input data are multiplied and added. This operation is carried out according to an operational instruction, for example, ABUTTERFLY.

The program controller 110 controls a program of a programmable processor. Also, the program controller 110 decodes an FFT instruction, transmits an N value from the N point FFT to the FFT address generator 130, and generates the FFT operation start signal. The FFT address generator 130 receives the N value and the operation start signal from the program controller 110 to generate the offset address of the data.

Figure 8:
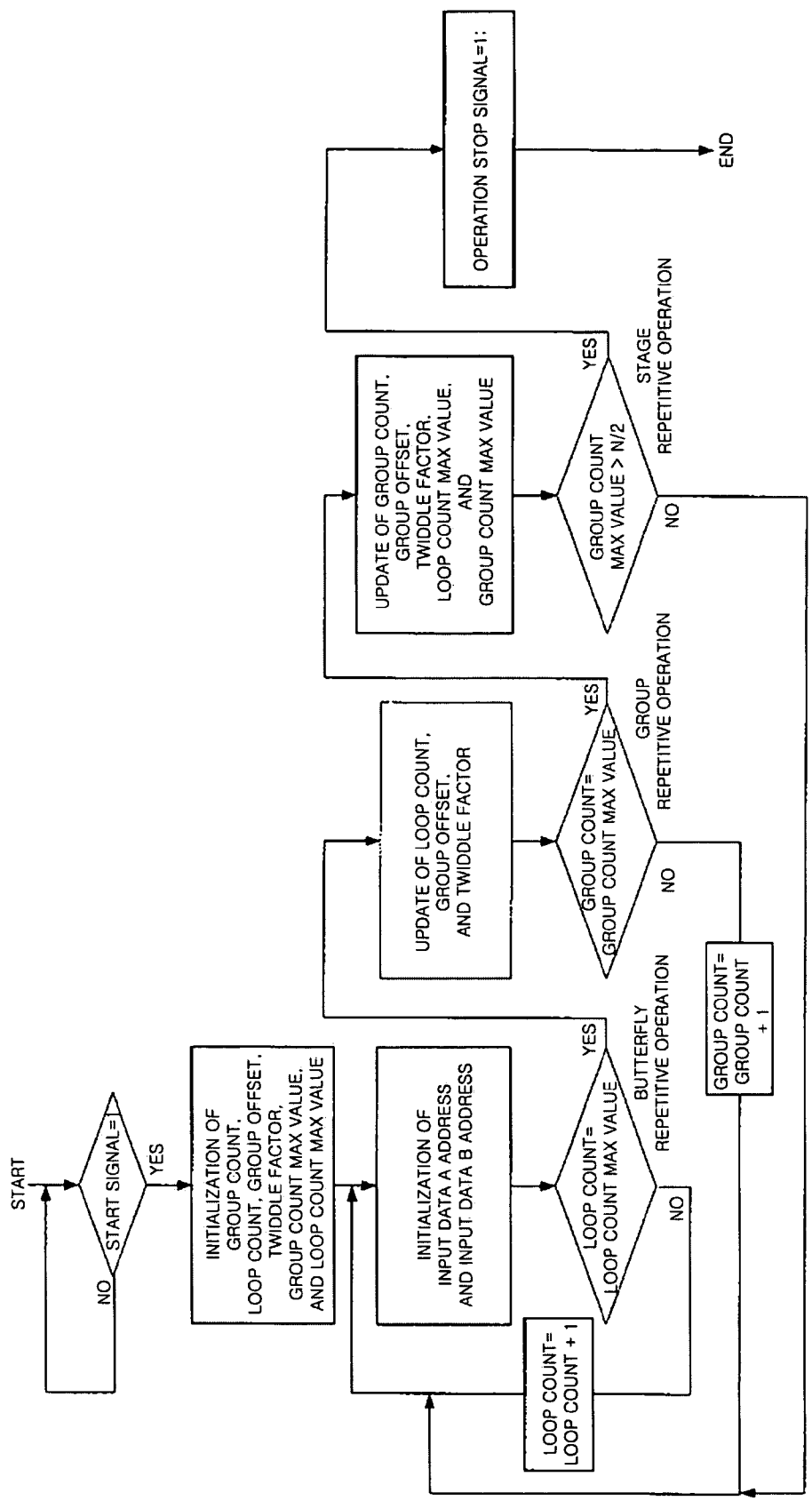
FIG. 8 is a flow chart showing the generation of an offset address of DIT butterfly data.

FIG. 8 shows a method to generate the offset address of the data in the FFT address generator 130, which includes starting the FFT upon the FFT start signal having a value of 1, and initializing a group count, a loop count, and a group count max value all to a value of 1. A group offset value is set to a value of −1, a loop count max value to a value of N/2, and an offset address value of the twiddle factor to 0 when the FFT starts. The method further includes calculating an address of input data A by adding the group offset and the loop count value, and an address of input data B by adding the group offset, the loop count, and the loop count max value. If the loop count value is not equal to the loop count max value, the loop count value is increased by 1 and the method resumed from the calculating the addresses of the input data A, B. If the loop count value is equal to the loop count max value, the loop count value is initialized to 1, setting the group offset value with a value obtained by multiplying the loop count max value by 2 and adding the group offset value, and increasing the twiddle factor by 1. If the group count is not equal to the group count max value, the group count is increased by 1 and the method resumed from calculating the addresses of the input data A, B. If the group count value is equal to the group count max value, the method initializes the group count value to 1, the group offset value to −1, and the twiddle factor to a value of 0, dividing the loop count max value by two, and multiplying the group count max value by two. If the group count max value is greater than N/2, the method generates an operation stop signal and ends the FFT operation. If the group count max value is not greater than N/2, the method resumes from calculating the addresses of the input data A, B.

To calculate the loops of the three stages having a butterfly operation loop, a group operation loop, and a stage operation loop, a comparison is carried out three times. A loop count max value and a group count max value respectively represent the number of the butterflies and the number of the groups that are included in each of the groups and the stages. If the loop count value and the group count value respectively reach their max value, the operation continues to a next group or stage. The group offset represents the address modification value when the group is altered.

Figure 9:
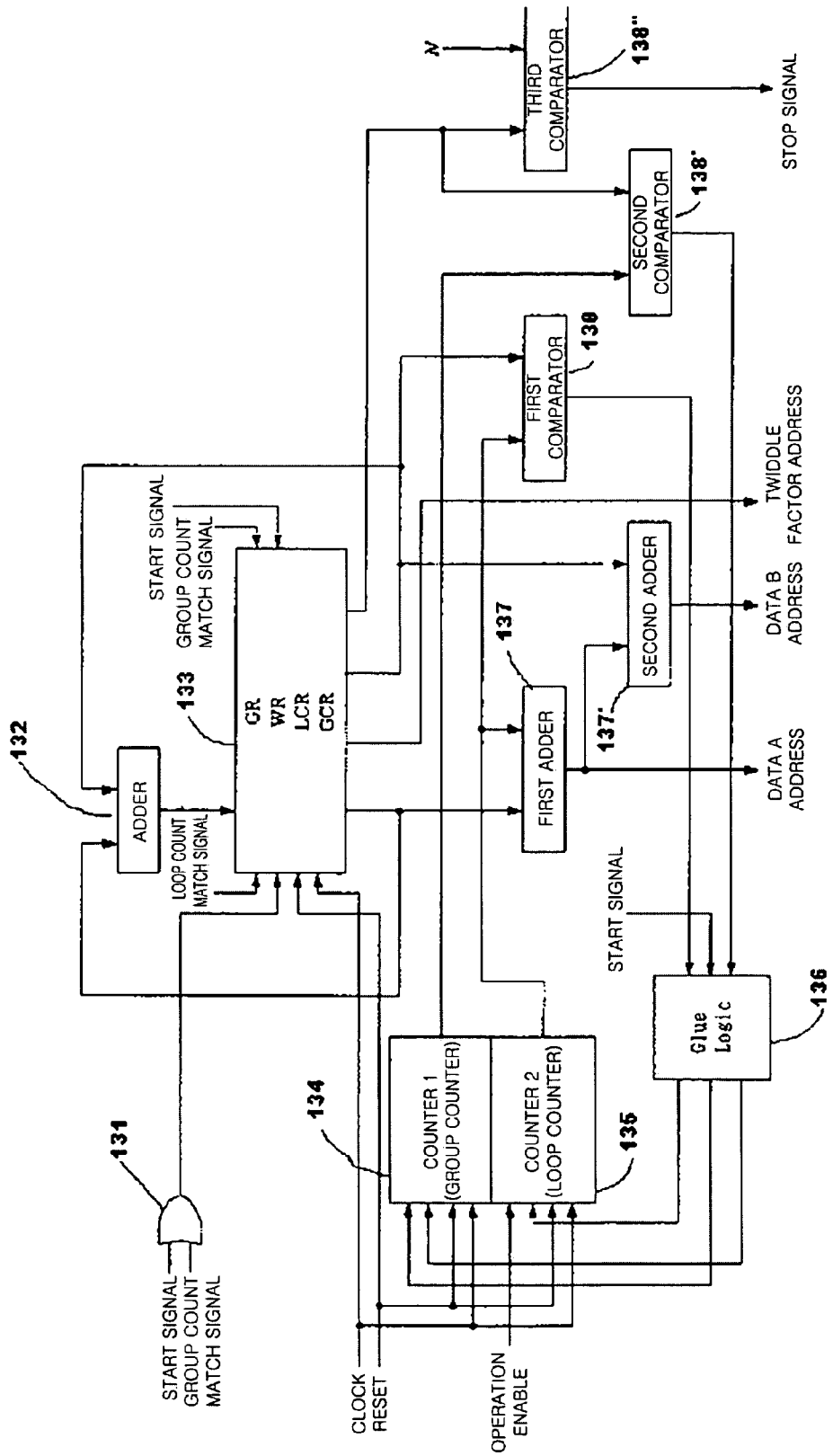
FIG. 9 is a view showing a configuration of an operator carrying out the operation of FIG. 8.

FIG. 9 shows the configuration of the FTT address generator 130 to carry out the operations shown in FIG. 8. Referring to FIG. 9, the FTT address generator 130 includes a logical sum logic 131, an adder 132, GR, WR, LCR, and GCR registers 133, a group counter 134, a loop counter 135, a glue logic 136, a first adder 137, a second adder 137', a first comparator 138, a second comparator 138', and a third comparator 138". The logical sum logic 131 generates an initialization signal of a register to store the loop count value and a register to store the group count value according to the start signal and a group count match signal. The adder 132 updates the group offset by a value obtained by multiplying the group offset and the loop count max value by 2 and adding the multiplied value. The GR, WR, LCR, GCR registers 133 store the group offset, the twiddle factor, the loop count max value, and the group count max value. The group counter 134 calculates the group count value, and the loop counter 135 calculates the loop count value. The glue logic 136 comprises logic which generates a signal to initialize the group counter and the loop counter. The first adder 137 outputs the address of the input data A by adding the group offset and the loop counter value. The second adder 137' outputs the address of the input data B by adding the output from the first adder 137 and the loop count max value. The first comparator 138 compares the loop count value and the loop count max value, the second comparator 138' compares the group counter value and the group count max value, and the third comparator 138" is input with the N value and the group count max value and compares the group count max value and the N/2 value.

If the FTT operation start signal is applied, the loop counter 135 and the group counter 134 are initialized to a value of 1, and GR, WR, LCR, GCR registers 133 are initialized to values of −1, 0, N/2, and 1, respectively. If values of the loop counter 135 and the LCR register 133 are identical, a value of one is applied to the loop count match signal. If values of the group counter 134 and the GCR register 133 are identical, a value of 1 is applied to the group count match signal. The group counter 134 carries out the counting only if the loop count match signal has a value of 1. The loop counter 135 and the group counter 134 are re-initialized when the loop count match signal and the group count match signal have a value of 1, respectively. The GR register 133 has a load input terminal to update a GR register value and another load input terminal to initialize the value. The WR register 133 increases a WR register value by 1 if the loop count match signal is 1, and is initialized to a value of 0, if the group count match signal is 1. The WR register 133 outputs a bit-reversed value. The LCR register 133 carries out a 1-bit right shift if the group count match signal equals a value of 1. An initial value of the LCR register 133 is N/2. The GCR register 133 carries out a 1-bit left shift every time the group count match signal is applied. If the GCR register value becomes N, the FFT operation stop signal is generated.

The offset address generated in the FFT address generator 130 is input to an offset register of the programmable processor and used as an offset for a base address. An aspect of the current invention includes a programmable processor that uses plural arithmetic and logic units to calculate the address. Hence, three final data addresses are calculated by using the offset addresses generated in the FTT address generator 130.

Figure 10:
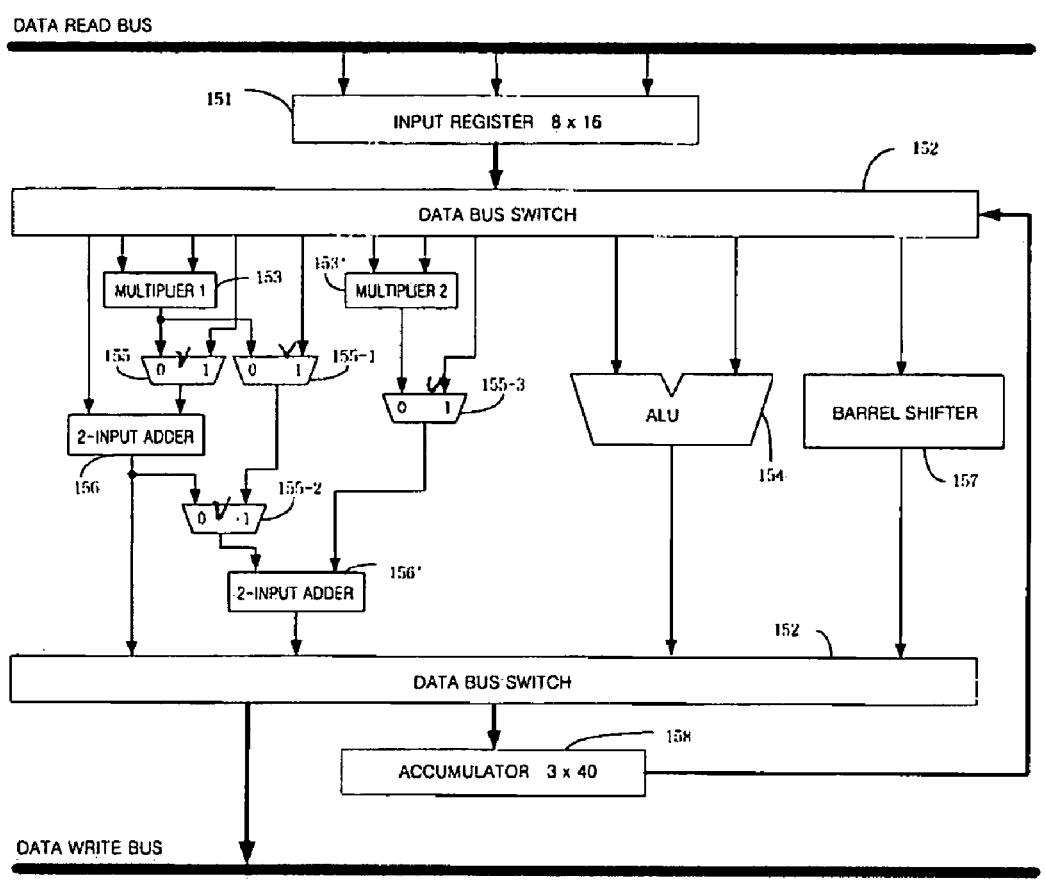
FIG. 10 is a view showing a configuration of a data processor carrying out the DIT butterfly operation according to an aspect of the present invention.

FIG. 10 shows a configuration of the data processor 150 that efficiently performs the FFT. Referring to FIG. 10, the data processing unit 150 includes two multiplier-accumulators and an arithmetic and logic unit to carry out the butterfly operation, a data bus switch circuit to control data according to the operation flow, eight input registers, and three accumulators. By using four multiplexers, the multiplier-accumulator according to an aspect of the present invention functions as two separate multiplier-accumulators or carries out a function of adding and accumulating two multiplied results.

Figure 11A:
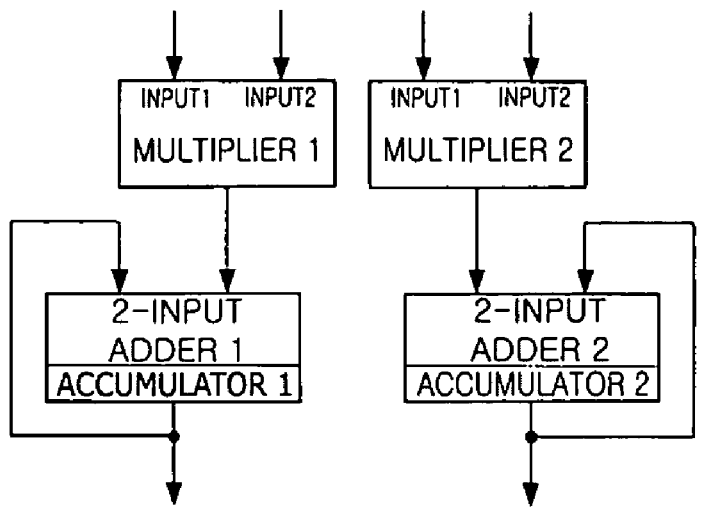
FIG. 11A is a view showing a configuration of a dual multiplier-accumulator having separate 2 multiplier-accumulators.
Figure 11B:
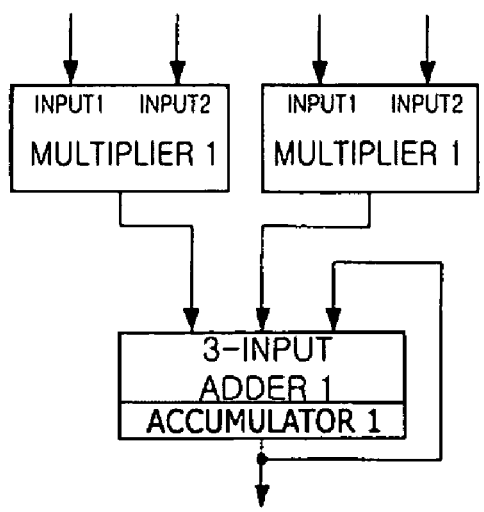
FIG. 11B is a view showing a configuration of a dual multiplier-accumulator using a 3-input adder.
Figure 11C:
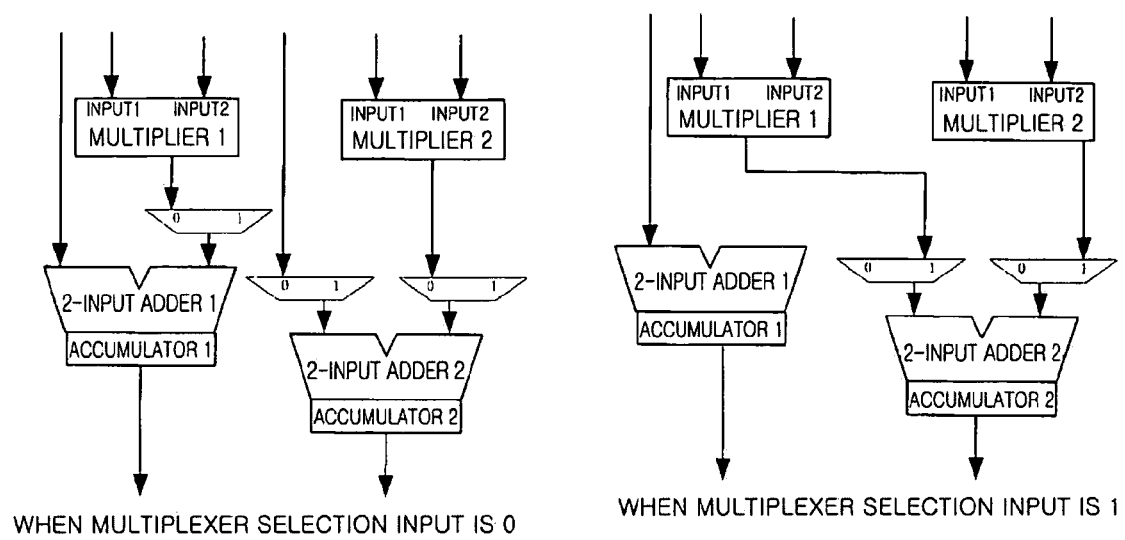
FIG. 11C is a view showing a dual multiplier-accumulator carrying out functions of FIGS. 11A and 11B using a multiplexer.

FIG. 11A shows a configuration of a conventional dual multiplier-accumulator having two separate multiplier-accumulators to output two accumulated results. FIG. 11B shows a configuration capable of accumulating a sum of two multiplied results by using a 3-input adder. FIG. 11C shows a dual multiplier-accumulator capable of carrying out the above operations by using the multiplexer according to an aspect of the present invention. If a selection input of the multiplexer has a value of 0, the dual multiplier-accumulator operates similarly to FIG. 11A, and if a selection input has a value of 1, the dual multiplier-accumulator operates similarly to FIG. 11B. Five input registers store values for $a_r$, $a_i$, $b_r$, $b_i$, $w_r$, and $w_i$, respectively. Three accumulators are required to store two multiplier-accumulator values and one arithmetic and logic unit value.

Figure 12:
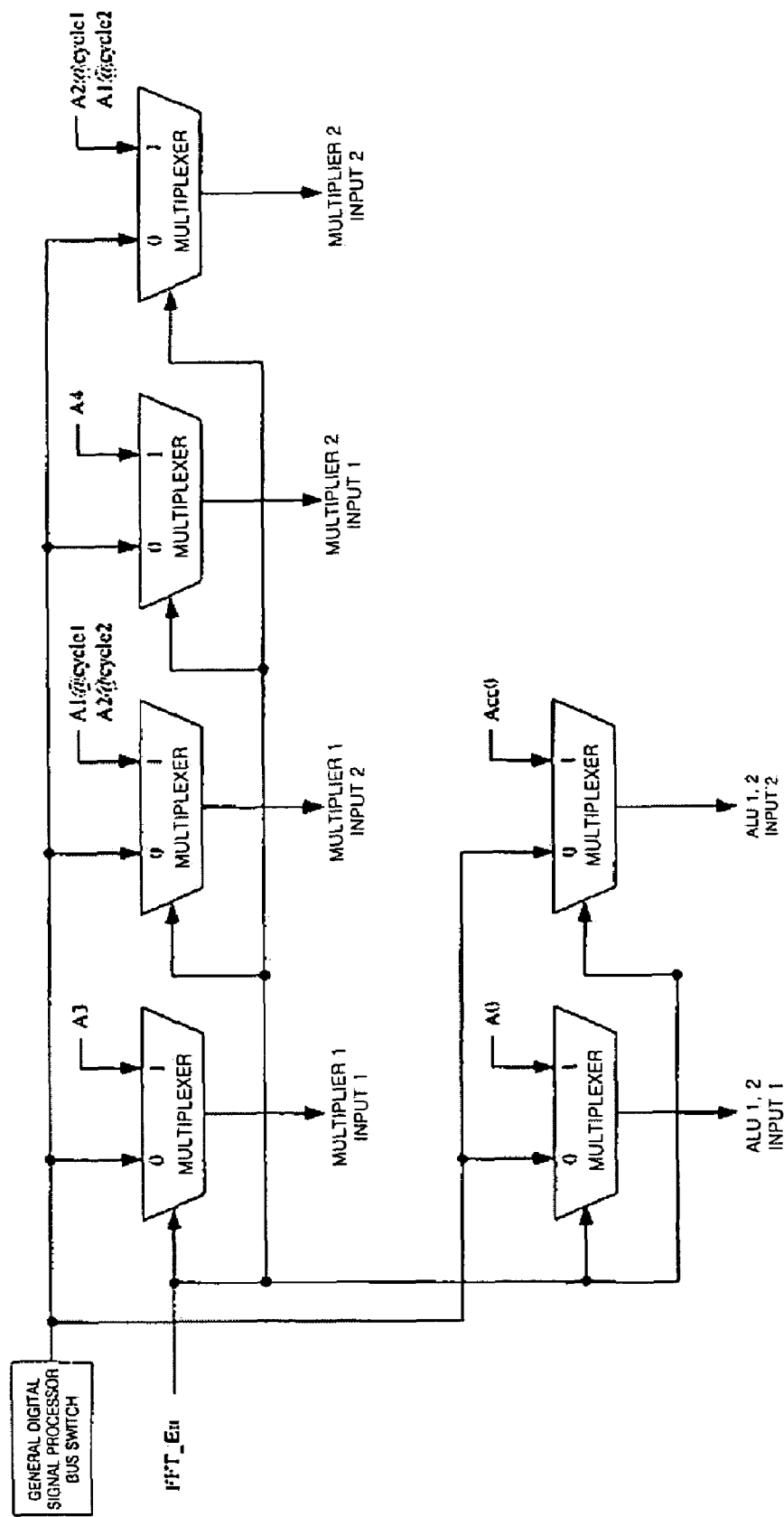
FIG. 12 is a view showing a configuration of a data bus switch of the data processing unit.

FIG. 12 shows the data bus switch of the data processor 150. The data bus switch is implemented using six 2×1 multiplexers adapted to a data bus switch of a conventional digital signal processor without having to re-design the circuit.

As aforementioned, the FFT operation method and circuit to implement the FFT operation method are provided to enhance performance by minimizing the operation cycles that occur in the looping instruction, the data move, and the address calculation of the butterfly input data in addition to the butterfly operation. In the conventional programmable processor performance is not enhanced through the acceleration of the butterfly operation. Further, according to an aspect of the present invention, the operating apparatus of the digital signal processor is re-used by including the FFT address generator 130 and the switch circuit of the data to thereby enhance the performance and facilitate the design and the modification.

Table 2 shows the comparison according to the number of the FFT operation cycles together with the number of the multiplier-accumulators between the conventional programmable processors and the present invention.

TABLE 2

| Digital signal processor | Number of butterfly operation cycles | N = 256 | N = 1024 | Formula | Number of MAC |
|---|---|---|---|---|---|
| DSP1620 | — | 16065 | — | — | 1 |
| DSP56602 | 8 | 9600 | 49680 | — | 1 |
| DSP56303 | — | 9096 | — | — | 1 |
| TMS320C54x | 8 | 8542 | 42098 | — | 1 |
| TMS320C55x | 5 | 4786 | — | — | 2 |
| TMS320C62x | 4 | 4225 | 20815 | $(4\,N/2)\log_2 N + 7 \log_2 N + N/4 + 9$ | 2 |
| TMS320C67x | — | 4286 | 20716 | $(2\,N/2)\log_2 N + 23 \log_2 N + 6$ | 2 |
| Carmel DSP core | 2 | 2452 | 11624 | $(2/N)\log_2 N + 5\,N/4 + 10 \log_2 N + 4$ | 2 |
| Palm DSP core | 2 | — | — | — | 2 |
| Frio core | 3 | 3176 | — | — | 2 |
| StarCore (SC140) | 1.5 | — | — | — | 4 |
| Configuration an aspect of the present invention | 2 | 2051 | 10243 | $(2\,N/2) \log_2 N + 6$ | 6 |

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A fast Fourier transform (FFT) operating apparatus to carry out an FFT operation in a programmable processor chip, comprising:

a program controller to generate an FFT start signal and control a programmable processor;

a program memory to store an application of the programmable processor;

an FFT address generator to remove a looping instruction used for the FFT and a cycle for an address generation, and generate an offset address of a butterfly input data and an operation end signal;

an address generator to calculate an address of a data memory using the offset address generated in the FFT address generator;

a data memory to store data;

a data processor to carry out an arithmetic and logic operation using the data stored in the data memory; and a flag register to generate an FFT operation signal.

2. The apparatus of claim 1, wherein the FFT address generator comprises:

a logical sum logic to generate initialization signals of a register to store a loop count value and a register to store a group count value according to the start signal and a group count match signal;

a first adder to update a group offset with a value obtained by adding the group offset and a loop count max value multiplied by 2;

GR, WR, LCR, and GCR registers to store the group offset, a twiddle factor, the loop count max value, and a group count max value;

a group counter to calculate the group count value;

a loop counter to calculate the loop count value;

a glue logic that generates a signal to initialize the group counter and the loop counter;

a second adder to add the group offset and the loop count value and output a single input data address;

a third adder to input with and add the second adder and the loop count max value and output another input data address;

a first comparator to compare a value of the loop counter and the loop count max value;

a second comparator to compare a value of the group counter and the group count max value; and a third comparator to input an N value and the group count max value and compare the group count max value with a N/2 value.

3. The apparatus of claim 1, wherein the data processor comprises:

a data bus switch circuit to provide the butterfly input data from the data memory and write an output data in the data memory;

a butterfly operation circuit having two multiplier-accumulators to multiply and accumulate a data and one arithmetic and logic unit;

an exponential operation circuit to carry out an exponential operation of a data in the butterfly operation;

an input register to store a value of the data memory; and an accumulator to store an operation result and re-use the stored value for the operation.

4. The fast Fourier transform (FFT) operating apparatus according to claim 3, wherein the two multiplier-accumulators function as either two separate multiplier-accumulators or carry out a function of adding and accumulating two multiplied results.

5. The fast Fourier transform (FFT) operating apparatus according to claim 3, wherein the data bus switch circuit is six 2×1 multiplexers adapted to a data bus switch.

6. The fast Fourier transform (FFT) operating apparatus according to claim 1, wherein an N point radix-2 DIT (Decimation-in-Time) FFT operation is carried out without generating additional cycles except for butterfly operations.

7. The fast Fourier transform (FFT) operating apparatus according to claim 1, wherein the program controller decodes an FFT instruction, transmits an N value from an N point FFT to the FFT address generator, and generates the start signal.

8. The fast Fourier transform (FFT) operating apparatus according to claim 7, wherein the FFT address generator receives the N value and the start signal from the program controller and generates the offset address.

9. A radix-2 complex fast Fourier transform (FFT) operation method to carry out an FFT operation in a programmable processor chip, comprising:

generating a start signal and applying an FFT operation signal if the FFT starts;

generating an offset address of butterfly input/output data to reads data and write an operated result in a data memory;

storing the generated offset address of the butterfly input/output data in an offset register of a programmable processor;

switching a data to provide the butterfly input data from the data memory and write the output data in the data memory;

carrying out a butterfly operation using two multiplier-accumulators, an arithmetic and logic unit, and an exponenter; and generating an end signal and resetting the FFT operation signal when the operation is ended.

10. The method of claim 9, wherein operation instructions SBUTTERFLY and ABUTTERFLY are used for the FFT operation.

11. The method of claim 9, wherein the generating the offset address by an FTT address generator comprises:

starting the FFT upon the FFT start signal having a value of 1;

initializing a group count, a loop count, and a group count max value to a value of 1, respectively, a group offset value to a value of 1, a loop count max value to N/2, and an offset address value of a twiddle factor to a value of 0 upon a start of the FFT;

calculating an input data address by adding the group offset and the loop count values and calculating another input data address by adding the group offset, the loop count, and the loop count max values;

increasing the loop count value by 1 upon the loop count value not equaling the loop count max value and resuming from calculating the two input data addresses;

initializing the loop count value to 1, setting the group offset value with a value obtained by multiplying the loop count max value by 2 and adding the group offset value to the multiplied value, and increasing the twiddle factor value by 1 upon the loop count value equaling the loop count max value;

increasing the group count value by 1 and resuming from calculating the two input data addresses upon the group count not equaling the group count max value;

initializing the group count value to 1, the group offset value to 1, and the twiddle factor value to 0, dividing the loop count max value by 2, and multiplying the group count max value by 2 upon the group count value equaling the group count max value;

generating the operation end signal and ending the FFT operation upon the group count max value being greater than a value of N/2; and resuming from calculating the two input data addresses upon the group count max value being not greater than a value of N/2.

12. A computer-readable storage controlling a computer including instructions for:

generating a start signal and applying an FFT operation signal if the FFT starts;

generating an offset address of butterfly input/output data to read data and write an operated result in a data memory;

storing the generated offset address of the butterfly input/output data in an offset register of a programmable processor chip;

switching data to provide the butterfly input data from the data memory and write the output data in the data memory;

carrying out a butterfly operation; and generating an end signal and resetting the FFT operation signal when the operation is ended.

13. The computer-readable medium of claim 12, wherein operation instructions SBUTTERFLY and ABUTTERFLY are used for the FFT operation.

* * * * *